United States Patent
Kang

(10) Patent No.: US 9,049,548 B2
(45) Date of Patent: Jun. 2, 2015

(54) METHOD AND APPARATUS FOR SETTING INFORMATION IN MOBILE TERMINAL

(71) Applicant: Samsung Electronics Co., Ltd., Gyeonggi-do (KR)

(72) Inventor: Hyeon-Jin Kang, Seoul (KR)

(73) Assignee: Samsung Electronics Co., Ltd (KR)

( * ) Notice: Subject to any disclaimer, the term of this patent is extended or adjusted under 35 U.S.C. 154(b) by 6 days.

(21) Appl. No.: 13/733,649

(22) Filed: Jan. 3, 2013

(65) Prior Publication Data

US 2013/0178247 A1 Jul. 11, 2013

(30) Foreign Application Priority Data

Jan. 5, 2012 (KR) .................. 10-2012-0001450

(51) Int. Cl.
*H04B 1/38* (2006.01)
*H04W 4/02* (2009.01)

(52) U.S. Cl.
CPC ..................................... *H04W 4/02* (2013.01)

(58) Field of Classification Search
CPC ........... H04W 4/02; H04W 8/18; H04W 8/24; H04W 40/20; H04W 40/22; H04W 40/24; H04W 64/00; H04W 68/00; H04W 92/08; H04M 2215/01; H04M 2207/00; H04M 2242/00; H04M 3/22; H04M 15/75
USPC .................. 455/418, 419, 558, 435.1–435.3; 379/219, 220.01, 221.14, 221.15
See application file for complete search history.

(56) References Cited

U.S. PATENT DOCUMENTS

| | | | |
|---|---|---|---|
| 8,385,895 B2* | 2/2013 | Rahman et al. | 455/414.3 |
| 8,619,665 B2* | 12/2013 | Hedberg et al. | 370/319 |
| 2003/0013494 A1* | 1/2003 | Imura | 455/566 |

\* cited by examiner

*Primary Examiner* — Amancio Gonzalez
(74) *Attorney, Agent, or Firm* — The Farrell Law Firm, P.C.

(57) ABSTRACT

A method and apparatus for setting information in a mobile terminal are provided. The mobile terminal detects country information from subscriber identification information of a user of the mobile terminal, and sets at least one information to be used in the mobile terminal based on the detected country information.

12 Claims, 3 Drawing Sheets

METHOD AND APPARATUS FOR SETTING INFORMATION IN MOBILE TERMINAL

PRIORITY

This application claims priority under 35 U.S.C. §119(a) to a Korean Patent Application filed in the Korean Intellectual Property Office on Jan. 5, 2012 and assigned Serial No. 10-2012-0001450, the entire disclosure of which is hereby incorporated by reference.

BACKGROUND OF THE INVENTION

1. Field of the Invention

The present invention generally relates to a method and apparatus for setting information in a mobile terminal, and more particularly, to a method and apparatus for setting information such as language, time, conversion units and a character encoding scheme corresponding to a user's language using country information in the mobile terminal.

2. Description of the Related Art

In a wireless communication system, a mobile terminal provides a multi-language interface, a unit-conversion function, time information, and so forth. A user has to manually set country information and time information to use an interface, a unit corresponding to a language, and a geographic location which are currently used by the user. That is, conventionally, when initially using the mobile terminal after purchasing it or moving to another country, the user experiences the inconvenience of manually setting a language, time, a unit, and so forth.

Furthermore, character encoding for a Short Message Service (SMS) is performed using different schemes for different languages used in different countries. Thus, the mobile terminal performs character encoding in a local encoding scheme based on local information.

However, when the user uses the mobile terminal, which has been used in the user's domestic or home country, in a foreign country (which uses a language that needs a different encoding scheme than a native language used by the user) by using a Subscriber Identification Module (SIM) card, or when the user uses a mobile terminal, which is purchased in the foreign country, while using the SIM card used in the user's domestic or home country, SMS transmission and reception may fail because the character encoding scheme set in the mobile terminal is different.

For example, when a user travels from a country, which uses the English language, and attempts to use a mobile terminal in a country which uses a language other than English, such as Chinese, Japanese, or the like, by using a prepaid SIM card, an SMS message including English may not be encoded and thus fail to be transmitted, or even if transmitted, the SMS message cannot be checked by a reception mobile terminal because of the failure to be encoded.

Moreover, when the user uses a mobile terminal, which the user purchases in the U.S., while using a SIM card which is used in China, an SMS message including Chinese may not include any contents, even if it is received.

To solve the foregoing problems, conventionally, a method has been provided in which a user of a mobile terminal directly sets a character encoding scheme. However, in this method, the user has to manually set the character encoding scheme, which is a troublesome and inefficient process.

SUMMARY OF THE INVENTION

Accordingly, the present invention is provided to address at least the above-described problems and provide at least the advantages described below.

An aspect of the present invention provides a method and apparatus for setting information in a mobile terminal.

Another aspect of the present invention provides a method and apparatus for setting information to be used in a mobile terminal, such as a language, time, and various conversion units, by using country information in the mobile terminal.

A further aspect of the present invention provides a method and apparatus for easily setting a character encoding scheme corresponding to a language used by a user, irrespective of a user's location, in a mobile terminal.

According to an aspect of the present invention, there is provided a method for setting information in a mobile terminal, the method including detecting country information from subscriber identification information of a user of the mobile terminal and setting at least one information to be used in the mobile terminal based on the detected country information.

According to another aspect of the present invention, there is provided a mobile terminal including a memory for storing subscriber identification information of a user of the mobile terminal, and a controller for detecting country information from the subscriber identification information and setting at least one information to be used in the mobile terminal based on the detected country information.

BRIEF DESCRIPTION OF THE DRAWINGS

The above and other features and advantages of embodiments of the present invention will be more apparent from the following detailed description taken in conjunction with the accompanying drawings, in which.

DETAILED DESCRIPTION OF EMBODIMENTS OF THE PRESENT INVENTION

Hereinafter, embodiments of the present invention will be described with reference to the accompanying drawings. In the following description, known functions and configurations will not be described in detail to avoid unnecessarily obscuring the subject matter of the present invention.

The present invention provides a method and apparatus for setting information of a mobile terminal. More specifically, the present invention provides a method and apparatus for detecting country information from subscriber identification information and setting at least one information to be used in the mobile terminal based on the detected country information.

The at least one information based on the country information (hereinafter referred to as 'country-based information') may include date and time information, language information, unit information, character encoding scheme information, and so forth. The subscriber identification information may include information included in a Subscriber Identification Module (SIM) card. However, the subscriber identification information may also include user-input information including the country information or information from which the country information may be inferred out of information stored in the mobile terminal, as well as the information included in the SIM card.

Before undertaking a detailed description of the present invention, a conventional method for setting country-based information in a mobile terminal will be described first with reference to FIG. 1.

Figure 1:
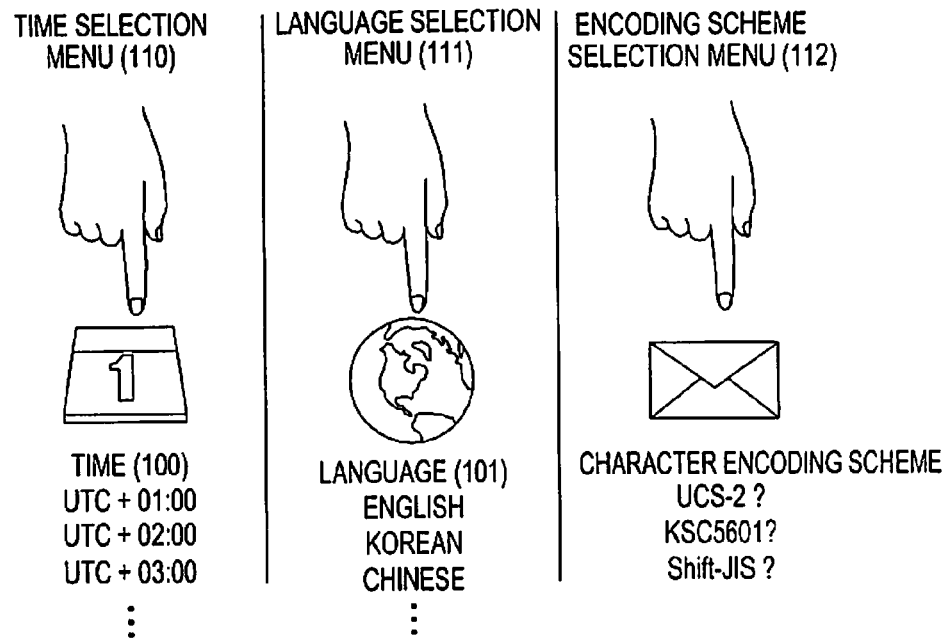
FIG. 1 is a diagram illustrating a method for setting country-based information in a conventional mobile terminal.

FIG. 1 is a diagram illustrating a method for setting country-based information in a conventional mobile terminal.

Referring to FIG. 1, in a conventional mobile terminal, a user cannot help experiencing the inconvenience of separately setting the country-based information, that is, a time 100, a language 101, and a character encoding scheme 102 through corresponding menus; that is, a time selection menu 110, a language selection menu 111, and an encoding scheme selection menu 112. Thus, the user must navigate each menu separately in a time-consuming and inconvenient manner to set the time, language, and encoding scheme. However, in an embodiment of the present invention, the country-based information is automatically set without being separately changed by the user, thereby solving the foregoing problems.

Figure 2:
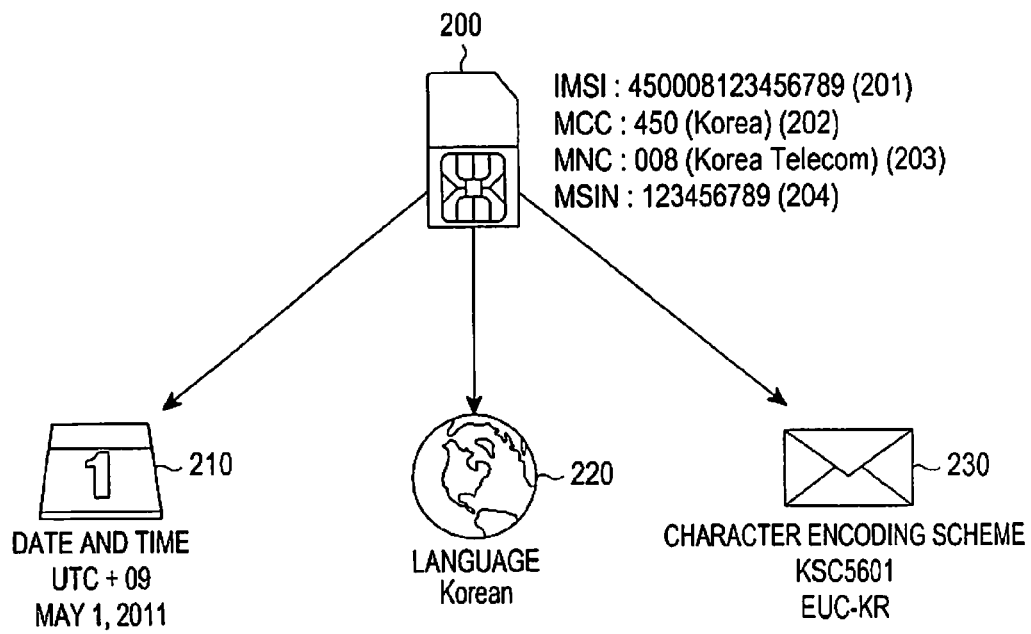
FIG. 2 is a diagram illustrating a Subscriber Identification Module (SIM) card used to set country-based information in a mobile terminal according to an embodiment of the present invention.

With reference to FIG. 2, FIG. 2 is a diagram illustrating a SIM card 200 used to set country-based information in a mobile terminal according to an embodiment of the present invention.

Referring to FIG. 2, the SIM card 200 may include, for example, International Mobile Subscriber Identity (IMSI) information 201 as subscriber identification information. The IMSI information 201 may include, for example, Mobile Country Code (MCC) information 202, which is country information, Mobile Network Code (MNC) information 203, which is common carrier information, and Mobile Subscriber Identification Number (MSIN) information 204, which is mobile phone number information. For example, if the MCC information 202 is "450" corresponding to South Korea, the MNC information 203 is "008", and the MSIN information 204 is "123456789", then the IMSI information 201 may be "450008123456789".

The MCC information 202, the MNC information 203, and the MSIN information 204 have fixed lengths, and may be included in the IMSI information 201 in a preset order. According to an embodiment of the present invention, an example is provided below in which the MCC information 202 and the MNC information 203 have lengths of three digits, respectively, the MSIN information 204 has a length of 9 digits, with the MCC information 202, the MNC information 203, and the MSIN information 204 included in the IMSI information 201 sequentially in that order. In this case, the first three digits of the IMSI information 201 are identified by the MCC information 202, the next three digits are identified by the MNC information 203, and the other nine digits are identified by the MSIN information 204.

An embodiment of the present invention provides a method and apparatus for automatically setting the country-based information, such as date and time information 210, language information 220, and character encoding scheme information 230 which are to be used in a mobile terminal, by detecting at least one of the MCC information 202 (the country information) and the MNC information 203 (the common carrier information), from the IMSI information 201.

Figure 3:
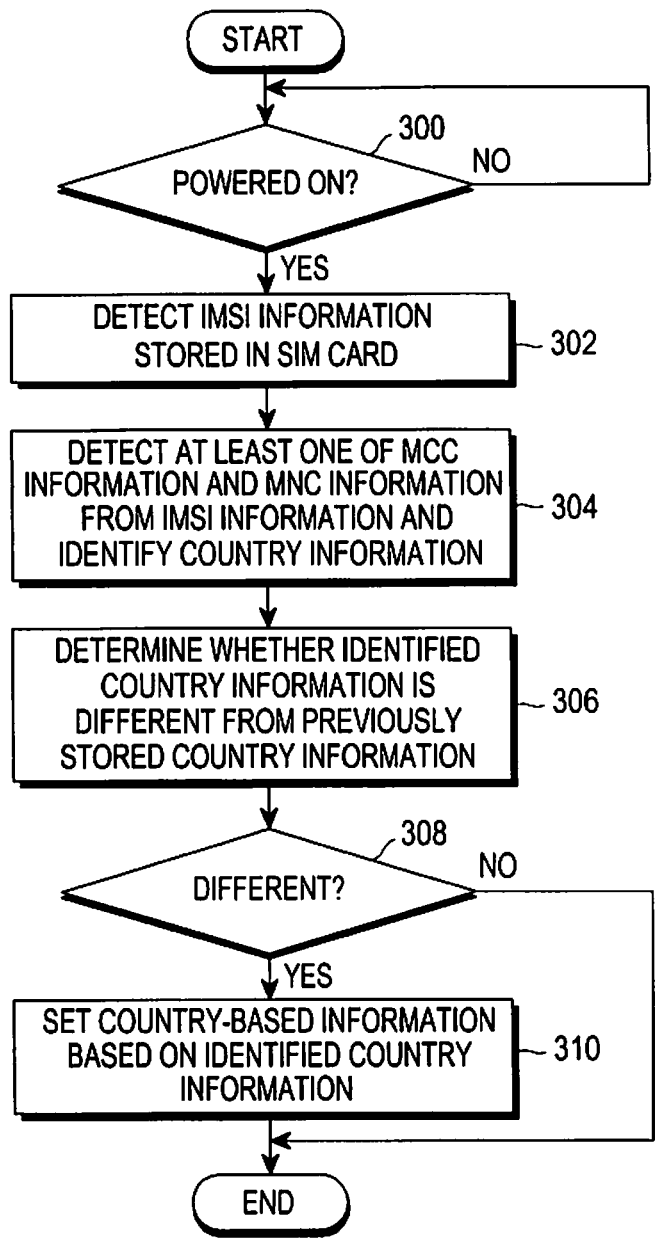
FIG. 3 is a flowchart illustrating a method for setting country-based information in a mobile terminal according to an embodiment of the present invention.

With reference to FIG. 3, FIG. 3 is a flowchart illustrating a method for setting country-based information in a mobile terminal according to an embodiment of the present invention.

Referring to FIG. 3, the mobile terminal determines whether it is powered on in step 300. If it is powered on, the mobile terminal detects IMSI information, which is subscriber identification information stored in the SIM card, in step 302. The mobile terminal detects at least one of MCC information and MNC information from the detected IMSI information to identify country information in step 304.

According to an embodiment of the present invention, the MCC information indicates a value included in first through third digits of the IMSI information from the left, and the MNC information indicates a value included in fourth through sixth digits of the IMSI information from the left. Therefore, if the IMSI information is, for example, "450008123456789", the mobile terminal detects "450" and "008" as the MCC information and the MNC information, respectively.

Once the MCC information is detected, the mobile terminal identifies country information corresponding to the detected MCC information. The mobile terminal identifies the country information by using a table in which country information is mapped to MCC information, as in Table 1.

TABLE 1

| MCC Information | Country Information |
|---|---|
| 450 | South Korea |
| 310 | U.S. |
| 440 | Japan |
| ... | ... |
| 208 | France |

The mobile terminal may identify country information corresponding to MCC information "450" as "South Korea", based on the country information mapping table, such as Table 1.

The mobile terminal, upon detecting the MNC information, identifies country information corresponding to the detected MNC information. The mobile terminal may identify the country information by using a table in which country information is mapped to MNC information, as in Table 2.

TABLE 2

| MNC Information | Common Carrier Information | Country Information |
|---|---|---|
| 008 | KT | South Korea |
| 053 | Verizon Wireless | U.S. |
| 04 | SoftBank Mobile Corp | Japan |
| ... | ... | ... |
| 23 | Omea Telecom | France |

The mobile terminal may identify country information corresponding to the MNC information "008" as "South Korea", based on the country information mapping table, such as Table 2.

As such, the mobile terminal identifies the country information by using one of the MCC information and the MNC information or both of them. Once identifying the country information as described above, the mobile terminal determines whether the identified country information is different from previously stored country information in step 306.

If it is determined that the identified country information is different from the previously stored country information in step 308, the mobile terminal sets country-based information, such as a date and a time, a language, various conversion units, and a character encoding scheme, which are to be used in the mobile terminal, based on the identified country information in step 310. If it is determined that the identified country information is not different from, that is, is the same as, the previously stored country information, the mobile terminal terminates the process. In other words, the mobile terminal uses the previously stored country-based information.

Figure 4:
FIG. 4 is a diagram illustrating a screen which allows a user to store country-based information in a mobile terminal according to an embodiment of the present invention.

After step 310, the mobile terminal displays a screen as shown in FIG. 4 to allow the user to store and use the set information. With reference to FIG. 4, a description will be made of a process in which the user stores the country-based information in the mobile terminal.

FIG. 4 is a diagram illustrating a screen which allows the user to store the country-based information in the mobile terminal according to an embodiment of the present invention.

Referring to FIG. 4, the mobile terminal, after performing step 310, displays the newly set country-based information based on the identified country information, for example, language information, area information, date and time information, unit (currency) information, and character encoding scheme information, on the screen, and then allows the user to selectively store and use the information displayed on the screen.

More specifically, the mobile terminal, after performing step 310, displays "Area Movement is Detected. Will You Change Information as Below?" on the screen. The mobile terminal displays the newly set country-based information on the screen, and stores the newly set country-based information according to user's selection. Herein, if the user selects an OK button, the mobile terminal stores the country-based information displayed on the screen; if the user selects a CANCEL button, the mobile terminal uses previously stored country-based information, without storing the country-based information displayed on the screen.

According to an embodiment of the present invention, multiple information may be displayed corresponding to one country-based information, and in this case, the user may select information to be used corresponding to the country-based information from the multiple information. For example, if country information "France" is detected, both of "Euro" and "Franc" may be used as the currency unit, such that the mobile terminal displays the two currency units on the screen to receive a user's selection between them.

Meanwhile, the user may use store and use the newly set country-based information, or a portion of the newly set country-based information, for example, at least one of language information, area information, date and time information, unit information, and character encoding scheme information. For example, if the user who has country information corresponding to South Korea moves to the U.S., the user may set and use the language information, the unit information, and the character encoding scheme information to correspond to South Korea, and may set and use the area information and the date and time information as the U.S. and the local date and time information of the U.S.

According to another embodiment of the present invention, the mobile terminal may not display the screen as illustrated in FIG. 4 and may change the country-based information without receiving a user's selection. For example, the mobile terminal, upon detecting the country information, may automatically update the country-based information at a time, based on a table in which mapping is made based on country information, such as Table 3.

TABLE 3

| Country Information | Language | Date and Time | Unit (Currency) | Character Encoding Scheme |
|---|---|---|---|---|
| South Korea | Korean | December 6, 2011 PM 04:15 | Won (\) | KSC5601 |
| U.S. | English | December 6, 2011 AM 02:15 | Dollar ($) | KSC5636 |
| China | Chinese | December 6, 2011 PM 03:15 | Yuan (元) | GB2312 |
| Japan | Japanese | December 6, 2011 PM 04:15 | Yen (¥) | EUC-JP |
| ... | ... | ... | ... | ... |
| France | French | December 6, 2011 AM 08:15 | Euro (€) | UTF-8 |

Figure 5:
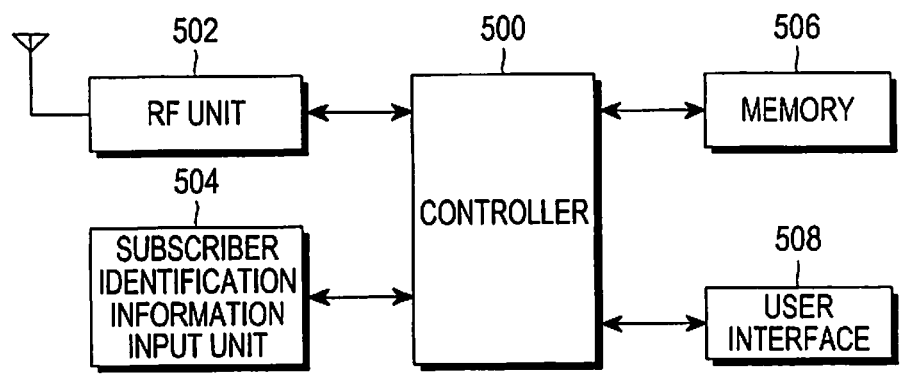
FIG. 5 is a block diagram illustrating a mobile terminal according to an embodiment of the present invention.

FIG. 5 is a block diagram illustrating the mobile terminal according to an embodiment of the present invention.

Referring to FIG. 5, the mobile terminal includes a controller 500, a Radio Frequency (RF) unit 502, a subscriber identification information input unit 504, a memory 506, and a user interface 508.

The RF unit 502 performs wireless communication of the mobile terminal. Subscriber identification information is input to the subscriber identification information input unit 504. More specifically, information included in the SIM card is input to the subscriber identification information input unit 504, or the subscriber identification information including country information is input to the subscriber identification information input unit 504 by the user.

The memory 506 stores the subscriber identification information which is input to the subscriber identification information input unit 504. The user interface 508 may include a display unit and an input unit, or may be implemented in the form of a touch screen which performs a display function and an input function to display a screen as illustrated in FIG. 4 and receive an input from the user.

The controller 500 controls the RF unit 502, the subscriber identification information input unit 504, the memory 506, and the user interface 508 to control the overall operation of the mobile terminal. The controller 500 performs the method according to an embodiment of the present invention as described with reference to FIGS. 2 through 4.

More specifically, the controller 500 performs the following operations if the information included in the SIM card is input to the subscriber identification information input unit 504. If the controller 500 is powered on, the controller 500 detects the IMSI information, which is the subscriber identification information stored in the memory 506. The controller 500 detects at least one of the MCC information and the MNC information from the detected IMSI information to identify the country information.

The controller 500 determines whether the identified country information is different from the previously stored country information. Herein, if the identified country information is different from the previously stored country information, the controller 500 sets country-based information, such as a date and a time, a language, various conversion units, and a character encoding scheme which are to be used in the mobile terminal, based on the identified country information. The controller 500 displays the screen as illustrated in FIG. 4 on the user interface 508 to receive a user's selection of whether the set country-based information is to be stored. The controller 500, upon receiving the user's selection, stores the country-based information, which is set according to the user's selection, in the memory 506. The controller 500 uses the previously stored country-based information, if the identified country information is not different from the previously stored country information.

As is apparent from the foregoing description, according to embodiments of the present invention, various information to be used in a mobile terminal may be more usefully set and used based on country information. Moreover, a character encoding scheme corresponding to a language used by a user may be easily set regardless of a user's location.

Furthermore, the user does not need to separately set information to be used in the mobile terminal, such as a language and various conversion units. In addition, a character encoding scheme corresponding to a language used by a user may be easily set regardless of a user's location.

While the present invention has been particularly shown and described with reference to embodiments thereof, various modifications or changes can be made without departing from the scope of the present invention. Therefore, the scope of the present invention is not limited to the disclosed embodiments, and it should be defined by the scope of the following claims and equivalents thereof.

What is claimed is:

1. A method for setting information in a mobile terminal, the method comprising:
    determining mobile network code (MNC) information from international mobile subscriber identity (IMSI) information of a subscriber identity module (SIM) card included in the mobile terminal without connecting with a wireless communication system;
    identifying country information corresponding to the MNC information based on a country information mapping table in which country information is mapped to MNC information; and
    setting information to be used in the mobile terminal based on the identified country information,
    wherein the information to be used in the mobile terminal includes date and time information, language information, unit information, and character encoding scheme information.

2. The method of claim 1, wherein determining the MNC information comprises determining the MNC information from the IMSI information, if the mobile terminal is powered on.

3. The method of claim 1, wherein the at least one of the language information, the unit information, and the character encoding scheme information are automatically updated whenever the country information corresponding to the MNC information is identified.

4. The method of claim 1, wherein setting the information to be used in the mobile terminal comprises:
    determining whether the identified country information is different from previously stored country information; and
    setting the information to be used in the mobile terminal based on the identified country information, if the identified country information is different from the previously stored country information.

5. The method of claim 1, further comprising:
    displaying the set information on a screen; and
    storing the set information according to a selection of the user of the mobile terminal.

6. A mobile terminal comprising:
    a subscriber identity module (SIM) card configured to store international mobile subscriber identity (IMSI) information of the mobile terminal; and
    a controller configured to determine mobile network code (MNC) information from the IMSI information without connecting with a wireless communication system, identify country information corresponding to the MNC information based on a country information mapping table in which country information is mapped to MNC information, and set information to be used in the mobile terminal based on the identified country information,
    wherein the information to be used in the mobile terminal includes date and time information, language information, unit information, and character encoding scheme information.

7. The mobile terminal of claim 6, wherein the controller determines the MNC information from the IMSI information, if the mobile terminal is powered on.

8. The mobile terminal of claim 6, wherein the at least one of the language information, the unit information, and the character encoding scheme information are automatically updated whenever the country information corresponding to the MNC information is identified.

9. The mobile terminal of claim 6, wherein the controller determines whether the identified country information is different from previously stored country information, and sets the information to be used in the mobile terminal based on the identified country information, if the identified country information is different from the previously stored country information.

10. The mobile terminal of claim 6, further comprising a user interface configured to display the set information on a screen and receive an input from the user of the mobile terminal, under control of the controller,
    wherein the controller stores the set information according to a selection of the user of the mobile terminal.

11. The method of claim 1, wherein the information to be used in the mobile terminal corresponding to at least two country information is previously stored in the mobile terminal.

12. The mobile terminal of claim 6, wherein the information to be used in the mobile terminal corresponding to at least two country information is previously stored in the mobile terminal.

* * * * *